(12) United States Patent
Itoh et al.

(10) Patent No.: US 9,383,221 B2
(45) Date of Patent: Jul. 5, 2016

(54) MEASURING DEVICE, METHOD, AND COMPUTER PROGRAM PRODUCT

(71) Applicant: KABUSHIKI KAISHA TOSHIBA, Tokyo (JP)

(72) Inventors: Yuta Itoh, Kanagawa (JP); Akihito Seki, Kanagawa (JP); Kenichi Shimoyama, Tokyo (JP); Satoshi Ito, Kanagawa (JP); Masaki Yamazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 333 days.

(21) Appl. No.: 14/070,872

(22) Filed: Nov. 4, 2013

(65) Prior Publication Data

US 2014/0132759 A1 May 15, 2014

(30) Foreign Application Priority Data

Nov. 14, 2012 (JP) .................................. 2012-250460

(51) Int. Cl.
  *G01C 25/00* (2006.01)
  *G01C 15/00* (2006.01)
  *G06T 7/00* (2006.01)

(52) U.S. Cl.
  CPC ................ *G01C 25/00* (2013.01); *G01C 15/00* (2013.01); *G06T 7/0018* (2013.01)

(58) Field of Classification Search
  CPC ....... G01C 25/00; G01C 15/00; G06T 7/0018
  See application file for complete search history.

(56) References Cited

U.S. PATENT DOCUMENTS

2007/0047940 A1* 3/2007 Matsumoto .......... G01C 15/004
                                                                  396/106
2009/0086497 A1* 4/2009 Kamioka ............... B60Q 1/085
                                                                  362/466

FOREIGN PATENT DOCUMENTS

JP         2007-064723         3/2007

OTHER PUBLICATIONS

Weng, J. et al., Camera Calibration with Distortion Models and Accuracy Evaluation, IEEE Transactions on Pattern Analysis and Machine Intelligence, vol. 14, No. 10, (Oct. 1992), pp. 965-980.

* cited by examiner

*Primary Examiner* — Tat Chio
(74) *Attorney, Agent, or Firm* — Nixon & Vanderhye, P.C.

(57) ABSTRACT

According to an embodiment, a measuring device includes a measuring unit, a capturing unit, an estimation unit, a calculator, and a detector. The estimation unit estimates, for each irradiated point, an estimated projection position on the image, using a direction and a distance of the irradiated point and calibration information based on calibration of a measuring unit and a capturing unit. The calculator calculates, for each irradiated point, an amount of change in reflection intensity and obtains a reflection intensity change point. The calculator calculates, for each estimated projection position, an amount of change in brightness and obtains a brightness change point. The detector detects a calibration shift between the measuring unit and the capturing unit by comparing the reflection intensity change point and the brightness change point.

9 Claims, 8 Drawing Sheets

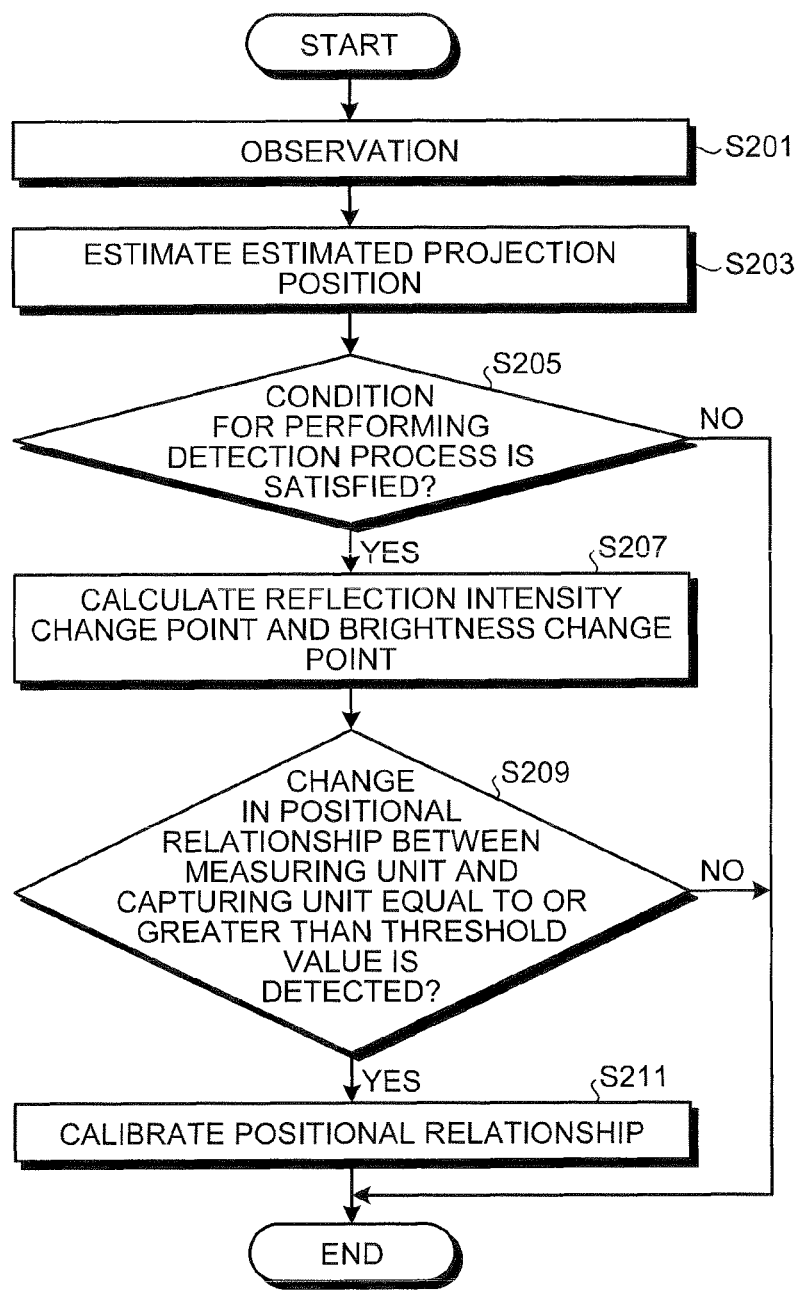

MEASURING DEVICE, METHOD, AND COMPUTER PROGRAM PRODUCT

CROSS-REFERENCE TO RELATED APPLICATION(S)

This application is based upon and claims the benefit of priority from Japanese Patent Application No. 2012-250460, filed on Nov. 14, 2012; the entire contents of which are incorporated herein by reference.

FIELD

Embodiments described herein relate generally to a measuring device, a method, and a computer program product.

BACKGROUND

A measuring device including a measuring unit, such as a distance sensor, and a capturing unit, such as a camera, constructs a three-dimensional model of a measurement target object by using a distance to the measurement target object measured by the measuring unit, the position of the measurement target object obtained from an image captured by the capturing unit, and calibration information of the measuring unit and the capturing unit.

With the measuring device as described above, calibration work is performed and calibration information is obtained in advance, but the relative position or posture between the measuring unit and the capturing unit may change over a long period of operation or the like, possibly resulting in a calibration shift. If a calibration shift occurs, the accuracy of measurement is greatly affected, and the calibration work has to be performed again to newly obtain calibration information.

A technique is known of detecting a calibration shift by irradiating a measurement target object with invisible light by a measuring unit, capturing the measurement target object by a capturing unit having, attached to the lens, an invisibility filter that blocks visible light but passes invisible light, and comparing a captured image obtained by capturing invisible light and a reference image.

BRIEF DESCRIPTION OF THE DRAWINGS

FIG. 8 is a flow chart showing an example process of the second embodiment.

DETAILED DESCRIPTION

According to an embodiment, a measuring device includes a measuring unit, a capturing unit, an estimation unit, a calculator, and a detector. The measuring unit irradiates an object with a plurality of light beams, and measure, for each light beam, a direction of an irradiated point on the object, a distance to the irradiated point, and reflection intensity of the irradiated point. The capturing unit captures the object that has been irradiated with the light beams and obtains an image. The estimation unit estimates, for each irradiated point, an estimated projection position on the image where the irradiated point is to be projected, using the direction and the distance of the irradiated point and calibration information based on calibration of the measuring unit and the capturing unit performed in advance. The calculator calculates, for each irradiated point, an amount of change in reflection intensity indicating an amount of change between the reflection intensity of the irradiated point and the reflection intensity of an irradiated point different from the irradiated point and obtains a reflection intensity change point which is an irradiated point for which the calculated amount of change in reflection intensity is equal to or greater than a first threshold value. The calculator calculates, for each estimated projection position, an amount of change in brightness indicating an amount of change between brightness at the estimated projection position and brightness at an estimated projection position different from the estimated projection position and obtains a brightness change point which is an estimated projection position for which the calculated amount of change in brightness is equal to or greater than a second threshold value. The detector detects a calibration shift between the measuring unit and the capturing unit by comparing the reflection intensity change point and the brightness change point.

Various embodiments will be described in detail with reference to the appended drawings.

First Embodiment

Figure 1:
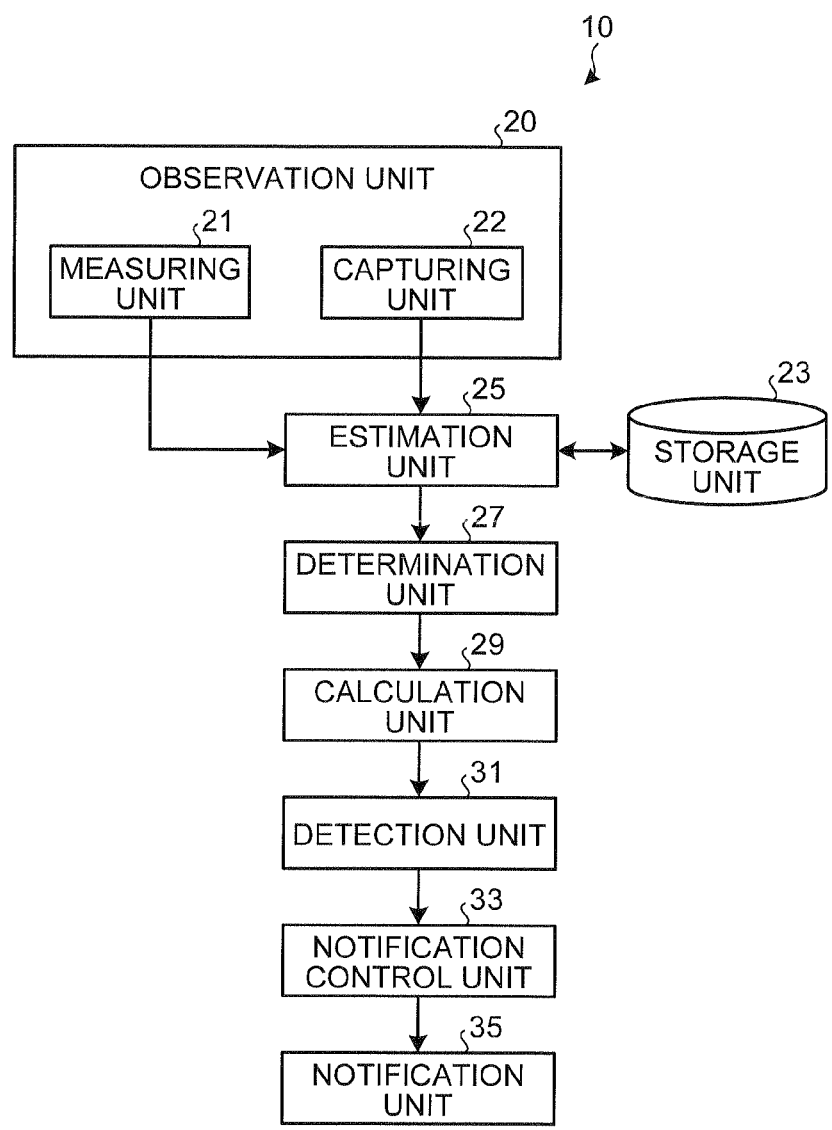
FIG. 1 is a configuration diagram showing an example of a measuring device of a first embodiment.

FIG. 1 is a configuration diagram showing an example of a measuring device 10 of a first embodiment. As shown in FIG. 1, the measuring device 10 includes an observation unit 20 including a measuring unit 21 and a capturing unit 22, a storage unit 23, an estimation unit 25, a determination unit 27, a calculation unit 29, a detection unit 31, a notification control unit 33, and a notification unit 35.

The measuring unit 21 may be implemented by a measuring device such as an LRF (Laser Range Finder), for example. The capturing unit 22 may be implemented by a capturing device such as an optical camera, for example. The storage unit 23 may be implemented by a storage device capable of performing storing magnetically, optically or electrically, such as an HDD (Hard Disk Drive), an SSD (Solid State Drive), a memory card, an optical disk, or a RAM (Random Access Memory), for example. The estimation unit 25, the determination unit 27, the calculation unit 29, the detection unit 31, and the notification control unit 33 may be implemented by software, that is, by causing a processing device such as a CPU (Central Processing Unit) to execute programs, for example. The notification unit 35 may be implemented by at least any of a display device such as a display, an audio output device such as a speaker, an illumination device such as a lamp or an LED, and the like, for example.

The observation unit 20 separately observes an object which is a target object of three-dimensional measurement by the measuring unit 21 and the capturing unit 22.

The measuring unit 21 irradiates an object with a plurality of light beams, and measures, for each light beam, the direction of an irradiated point on the object, the distance to the irradiated point, and the reflection intensity of the irradiated point. The irradiated point is a position on the object irradiated with the light beam. The reflection intensity is a value determined based on the energy of light reflected from the irradiated point.

For example, the measuring unit 21 irradiates an object, which is a target object to three-dimensional mearsurement, with a plurality of light beams invisible to the observation unit 20, and measures, for each light beam, the light reflected from the irradiated point. The measuring unit 21 thereby measures the direction from the measuring unit 21 to the irradiated point, the distance from the measuring unit 21 to the irradiated point, and the reflection intensity of the irradiated point.

A case where the light beam emitted by the measuring unit 21 is invisible light is described in the first embodiment, but this is not restrictive, and the light beam may be visible light, for example.

The capturing unit 22 captures an object that has been irradiated with a plurality of light beams by the measuring unit 21, and acquires an image. For example, the capturing unit 22 captures visible light in a space including the object, and acquires an image recording the brightness of the captured target.

Incidentally, the measuring unit 21 and the capturing unit 22 are fixedly arranged in such a way that a space where a light beam is emitted by the measuring unit 21 and a space captured by the capturing unit 22 overlap each another. Also, the capturing unit 22 is to capture an object in a state where the object is irradiated with a light beam by the measuring unit 21.

Figure 2:
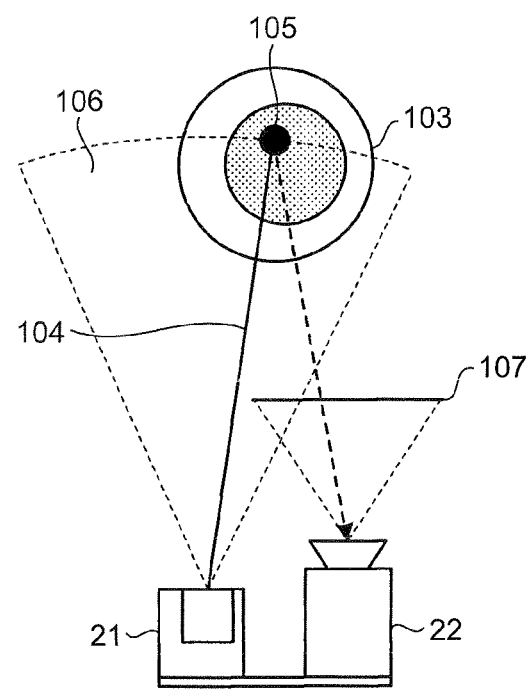
FIG. 2 is an explanatory diagram of an example observation by an observation unit of the first embodiment.

FIG. 2 is an explanatory diagram showing an example of observation by the observation unit 20 of the first embodiment. As shown in FIG. 2, the measuring unit 21 emits a light beam 104 in such a way that an irradiation plane 106 irradiated with the light beam overlaps an object 103 and measures reflected light of the light beam 104 from the irradiated point 105 to thereby measure the direction of the irradiated point 105, the distance to the irradiated point 105, and the reflection intensity of the irradiated point 105. Also, the capturing unit 22 perceives the object 103 in an image 107 which has been captured, and records the brightness of the capturing target such as the object 103 in the image 107.

The storage unit 23 stores therein calibration information that is based on calibration by the measuring unit 21 and the capturing unit 22 performed in advance. The calibration information indicates at least one of the relative position and the relative posture between the measuring unit 21 and the capturing unit 22. For example, the calibration information may be geometric transformation parameters (Rrc, Trc) of rotation and translation from a measurement coordinate system Or defined by an optical center and an optical axis direction of the measuring unit 21 to a capturing coordinate system Oc defined by an optical center and an optical axis direction of the capturing unit 22.

The estimation unit 25 estimates, for each irradiated point, an estimated projection position on the image captured by the capturing unit 22 where the irradiated point is to be projected, using the direction and the distance of the irradiated point measured by the measuring unit 21 and the calibration information stored in the storage unit 23.

The estimated projection position is a position on an image where an irradiated point is expected to be projected, and does not necessarily coincide with the position on the image where the irradiated point is actually projected. In the following, description will be given referring to the position on an image where an irradiated point is expected (estimated) to be projected as the estimated projection position and the position on the image where the irradiated point is actually projected as a real projection position.

For example, the estimation unit 25 estimates an estimated projection position x on an image captured by the capturing unit 22, using a three-dimensional position Xr of an irradiated point in the measuring coordinate system Or, calibration information (Rrc, Trc), a distortion model coefficient of the capturing unit 22, and a projection function.

The three-dimensional position Xr is determined by the direction and the distance of an irradiated point measured by the measuring unit 21. The distortion model coefficient is known at the capturing unit 22, and an intrinsic parameter matrix K representing a focal length and an image center, a lens distortion function or the like corresponds to the coefficient, for example. In the first embodiment, a distortion model expressed by a total of five parameters, three parameters for radial distortion and two parameters for tangential distortion, is used as the lens distortion function, but this is not restrictive, and a more complex distortion model may also be used depending on the model of the lens of the capturing unit 22. The projection function may be defined using Formula (16) in Weng, J. and Cohen, P. and Herniou, M., "Camera calibration with distortion models and accuracy evaluation," IEEE Transactions on pattern analysis and machine intelligence, volume 14, number 10, 1992, pp. 965-980, for example.

Figure 3:
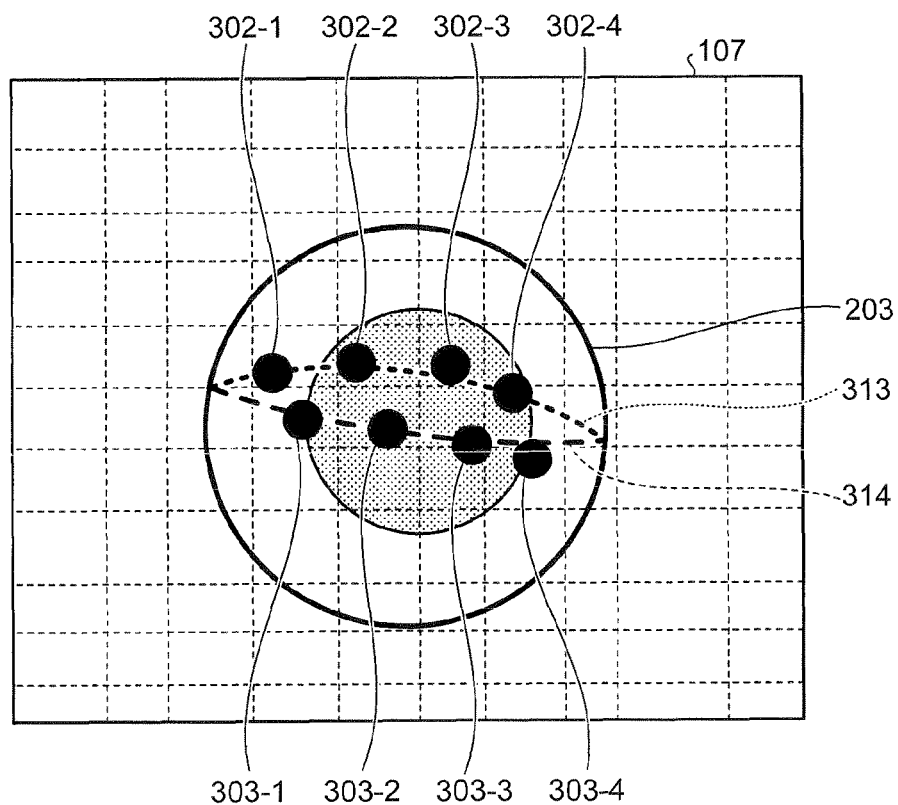
FIG. 3 is a diagram showing an example of an estimated projection position of the first embodiment.

FIG. 3 is a diagram showing an example of the estimated projection position estimated by the estimation unit 25 of the first embodiment. As shown in FIG. 3, estimated projection positions 303-1 to 303-4 estimated by the estimation unit 25 are shown together with real projection positions 302-1 to 302-4 of four irradiated points on an object image 203 in an image 107 captured by the capturing unit 22. The object image 203 is an image of the object 103. A track 313 represents the track of the real projection positions 302-1 to 302-4, and a track 314 represents the track of estimated projection positions 303-1 to 303-4.

Additionally, in the example of FIG. 3, a case is described as an example where there are four irradiated points, but the number of irradiated points is not restricted to four. Also, the real projection positions 302-1 to 302-4 are shown for the sake of explanation, but since the light beams are of invisible light in the first embodiment, they are not actually shown in the image 107.

The determination unit 27 calculates the reliability of at least one of a measurement result of the measuring unit 21 and an image captured by the capturing unit 22, and determines whether the calculated reliability satisfies a predetermined condition. At least one of the direction, the distance and the reflection intensity of the irradiated point corresponds to the measurement result of the measuring unit 21.

For example, to check whether the object is correctly perceived by the measuring unit 21, the determination unit 27 calculates first reliability based on the ratio of the irradiated points regarding which the measurement results of the measuring unit 21 are indefinite.

Also, for example, to check whether there is a blur in an image captured by the capturing unit 22, the determination unit 27 calculates a sum of smoothness from a correlation image storing a correlation value of the brightness of each pixel of the image and the brightness of a pixel near the pixel, and calculates second reliability. Normalized cross-correlation corresponds to the correlation value, for example. A filtered image obtained by applying a Laplacian filter to the correlation image corresponds to the smoothness, for example. A sum of pixel values of the filtered image corresponds to the sum of smoothness, for example.

Then, in the case the first reliability is equal to or less than a first predetermined value and the object is not correctly perceived by the measuring unit 21, or the second reliability is equal to or less than a second predetermined value and there is a blur in the image, or both conditions are satisfied, the determination unit 27 determines that the detection condition for a calibration shift is not satisfied.

In the case the determination unit 27 determines that the detection condition for a calibration shift is not satisfied, the processing of the calculation unit 29, the detection unit 31 and the notification control unit 33 described later is stopped. Additionally, in the case of performing determination by the determination unit 27 before estimation by the estimation unit 25, the processing of the estimation unit 25 is also stopped. On the other hand, in the case the determination unit 27 determines that the detection condition for a calibration shift is satisfied, the processing of the calculation unit 29, the detection unit 31 and the notification control unit 33 is continued.

The calculation unit 29 calculates, for each irradiated point, an amount of change in reflection intensity indicating an amount of change between the reflection intensity of the irradiated point and the reflection intensity of an irradiated point different from the aforementioned irradiated point, and obtains a reflection intensity change point which is an irradiated point for which the calculated amount of change in reflection intensity is equal to or greater than a first threshold value. The amount of change in reflection intensity indicates the amount of change in reflection intensity between adjacent irradiated points, for example. Likewise, the calculation unit 29 calculates, for each estimated projection position, an amount of change in brightness indicating an amount of change between the brightness at the estimated projection position and the brightness at an estimated projection position different from the aforementioned estimated projection position, and obtains a brightness change point which is an estimated projection position for which the calculated amount of change in brightness is equal to or greater than a second threshold value. The amount of change in brightness indicates the amount of change in brightness between adjacent estimated projection positions, for example.

Here, a concrete method of obtaining a reflection intensity change point and a brightness change point will be described taking as an example a case where n (n≥2) light beams are emitted by the measuring unit 21 on an object, and where emitting directions of the light beams are defined as $X_1$, $X_2$, ..., $X_i$, ..., $X_j$, ..., $X_n$ in this order from the first. Additionally, the i and the j are variables taking values between 1 to n.

In this case, an amount of change in reflection intensity dR(i,j) between reflection intensity R(i) of an irradiated point at an i-th direction $X_i$ and reflection intensity R(j) of an irradiated point at a j-th direction $X_j$ may be defined by Formula (1), and an amount of change in brightness dI(i, j) between brightness I(i) of an estimated projection position at the i-th direction $X_i$ and brightness I(j) of an estimated projection position at the j-th direction $X_j$ may be defined by Formula (2).

$$dR(i,j)=R(j)-R(i) \quad (1)$$

$$dI(i,j)=I(j)-I(i) \quad (2)$$

Additionally, noise removal may be performed in advance on the reflection intensity R(i) and the brightness I(i) using a known filtering method such as bilateral filtering, for example, to reduce observation errors.

Also, a set of IDs of directions (indices of X) is given as D:={1, ..., n}, and a direct product D×D of D is given as D2. The D2 represents a set including a pair of any two elements among elements of D, such as {3, 2}, {1, n} or {1, 1}.

Furthermore, with respect to Dsub ⊂ D2 which is a subset of D2, if a first threshold value $a_1$ is used, a reflection intensity change point CR may be defined by Formula (3), and if a second threshold value $a_2$ is used, a brightness change point CI may be defined by Formula (4).

$$CR=\{di| |dR(di)|>a1, \forall di \in Dsub\} \quad (3)$$

$$CI=\{di| |dI(di)|>a2, \forall di \in Dsub\} \quad (4)$$

Here, to select Dsub, it is preferable that all the sets {(1, 2), (2, 3), ..., (n-1, n)} of two adjacent directions are used.

Figure 4:
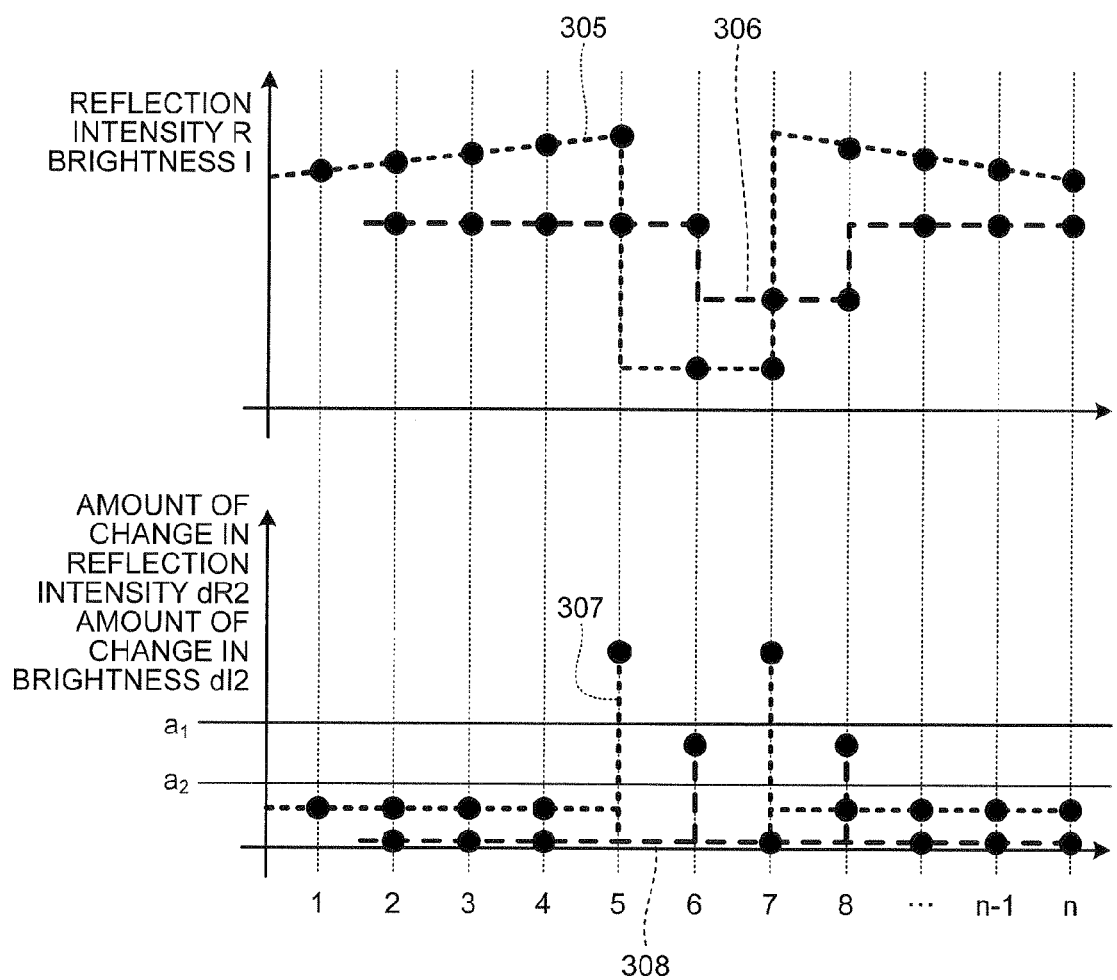
FIG. 4 is an explanatory diagram showing an example of a method of obtaining a reflection intensity change point and a brightness change point of the first embodiment.

FIG. 4 is an explanatory diagram showing an example of a method of obtaining a reflection intensity change point and a brightness change point of the first embodiment, where Dsub is {(1, 2), (2, 3), ..., (n-1, n)}.

In the example shown in FIG. 4, reflection intensity 305 indicates reflection intensity R(i) at each direction, and an amount of change in reflection intensity 307 indicates an amount of change in reflection intensity dR2(i) at each direction. Additionally, in the example shown in FIG. 4, the amount of change in reflection intensity dR2(i) is defined by Formula (5) by an ID(i) which is the origin and an adjacent ID(i+1) after incrementing.

$$dR2(i)=dR(i, i+1) \quad (5)$$

Also, in the example shown in FIG. 4, brightness 306 indicates brightness I(i) at each direction, and an amount of change in brightness 308 indicates an amount of change in brightness dI2(i) at each direction. Additionally, in the example shown in FIG. 4, the amount of change in brightness dI2(i) is defined by Formula (6) by an ID(i) which is the origin and an adjacent ID(i+1) after incrementing.

$$dI2(i)=dI(i, i+1) \quad (6)$$

Then, an element of the reflection intensity change point CR obtained by Formula (3) and an element of the brightness change point CI obtained by Formula (4) are each associated one to one with the direction of an ID which is the origin, based on the first threshold value $a_1$ or the second threshold value $a_2$. For example, a direction $X_i$ is associated with an element (i, i+1).

In the example shown in FIG. 4, the elements of the reflection intensity change point CR are (5, 6) associated with a direction $X_5$ and (7, 8) associated with a direction $X_7$, and the elements of the brightness change point CI are (6, 7) associated with a direction $X_6$ and (8, 9) associated with a direction $X_8$.

Additionally, the amount of change in reflection intensity 307 and the amount of change in brightness 308 may be interpreted as differential values with respect to direction. Accordingly, when selecting Dsub, the amount of change in reflection intensity 307 and the amount of change in brightness 308 may be replaced by known discrete differentiation.

The detection unit 31 compares the reflection intensity change point and the brightness change point obtained by the calculation unit 29, and detects a calibration shift between the measuring unit 21 and the capturing unit 22. Specifically, the detection unit 31 detects the calibration shift based on the rate of coincidence between the projection positions on an image of a plurality of reflection intensity change points obtained by the calculation unit 29 (the real projection positions of a plurality of reflection intensity change points) and a plurality of brightness change points obtained by the calculation unit 29.

For example, the detection unit 31 obtains, with respect to Dsub, a rate r0 of coincidence between the reflection intensity change points and the brightness change points using Formula (7), obtains a rate r1 of coincidence between the reflection intensity change points and the brightness change points in the set of the reflection intensity change points and the brightness change points using Formula (8), and a significance r2 of the amount of change of the reflection intensity change points and the brightness change points using Formula (9).

$$r0 = |CR \cap CI|/|Dsub| \quad (7)$$

$$r1 = |CR \cap CI|/|CR \cup CI| \quad (8)$$

$$r_2 = \frac{\sum_{di \in |CR \cap CI|} w(dR(di), dI(di))/|CR \cap CI|}{\sum_{di \in |D_{sub}|} w(dR(di), dI(di))/|D_{sub}|} \quad (9)$$

Here, the ∩ represents a product set, and the ∪ represents a sum set. The function w represents a weight of a change point, and is preferably defined by Formula (10) or (11).

$$w(dR(di), dI(di)) = dR(di)*dI(di) \quad (10)$$

$$w(dR(di), dI(di)) = \text{Log}(dR(di)*dI(di)) \quad (11)$$

Then, if any of Formulae (12) to (14) is established, the detection unit 31 detects that there is a calibration shift between the measuring unit 21 and the capturing unit 22.

$$r0 > a3 \quad (12)$$

$$r1 > a4 \quad (13)$$

$$r2 > a5 \quad (14)$$

Here, a3, a4 and a5 are preferably positive predetermined values.

In the case a calibration shift is detected by the detection unit 31, the notification control unit 33 causes the notification unit 35 to issue a notification of that fact. The notification unit 35 displays or outputs in the form of audio a sentence "calibration shift has occurred", for example.

Additionally, if at least one of r0, r1 and r2 is greater than a predetermined value, the notification control unit 33 may cause the notification unit 35 to issue the notification, emphasizing that the degree of calibration shift is great. In this case, the notification unit 35 displays or outputs in the form of audio a sentence "(large) calibration shift has occurred", for example.

Also, to present the state of current calibration, the notification control unit 33 may cause the notification unit 35 to display the estimated projection position by superimposing the same on the image by the projection function described above, for example. In this case, the notification control unit 33 desirably causes the color of a pixel that is to be superimposed to be a color that is in accordance with the reflection intensity or a color that is in accordance with the distance.

For example, the notification control unit 33 causes the notification unit 35 to display a circle drawn on an image, the circle having a diameter of $D_3*D_2$ pixels and whose center is the estimated projection position, by taking predetermined values $D_{min}$, $D_{max}(D_{min} < D_{max})$, $I_{max}$ and $I_{min}(I_{min} < I_{max})$, defining, with respect to distance $D_1$ and reflection intensity $I_1$, $D_2$ by Formula (15) and $I_2$ by Formula (16), using a color with a hue $360°*D_2$ and chroma specified by $I_2$, and using a predetermined value $D_3$ which is preferably a positive value.

$$D_2 = \begin{cases} 0 & \text{if } D_1 < D_{min} \\ 1 & \text{if } D_{max} < D_1 \\ (D_1 - D_{min})/(D_{max} - D_{min}) & \text{otherwise} \end{cases} \quad (15)$$

$$I_2 = \begin{cases} 0 & \text{if } I_1 < I_{min} \\ 1 & \text{if } I_{max} < I_1 \\ (I_1 - I_{min})/(I_{max} - I_{min}) & \text{otherwise} \end{cases} \quad (16)$$

Also, in the case the determination unit 27 determines that the detection condition for a calibration shift is not satisfied, the notification control unit 33 may cause the notification unit 35 to issue a notification of that fact.

Figure 5:
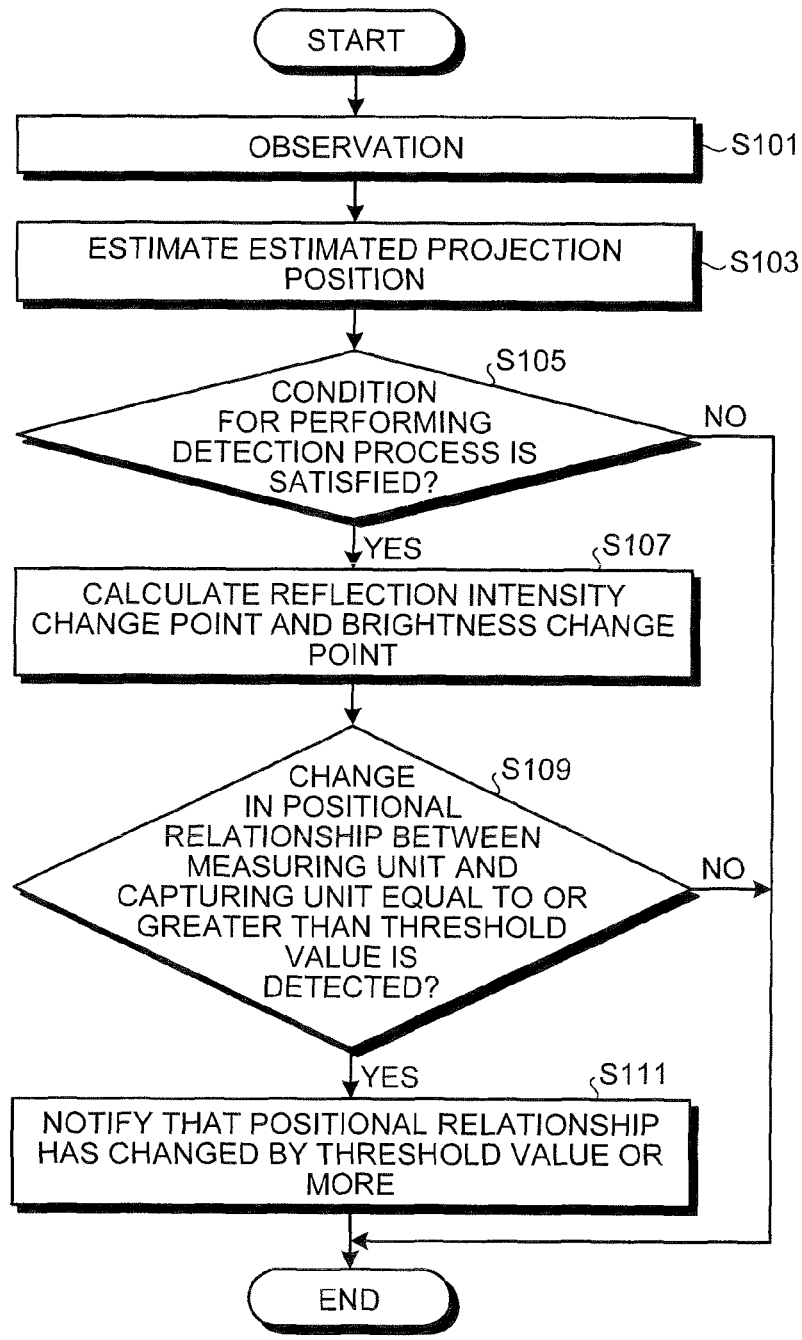
FIG. 5 is a flow chart showing an example process of the first embodiment.

FIG. 5 is a flow chart showing an example of flow of a process performed by the measuring device 10 of the first embodiment.

First, the observation unit 20 separately observes an object by the measuring unit 21 and the capturing unit 22 (step S101). The measuring unit 21 irradiates the object with a plurality of light beams, and measures, for each light beam, the direction of an irradiated point on the object, the distance to the irradiated point, and the reflection intensity of the irradiated point, and the capturing unit 22 captures the object irradiated by the measuring unit 21 with the plurality of light beams, and obtains an image.

Then, the estimation unit 25 estimates, for each irradiated point, an estimated projection position on the image captured by the capturing unit 22 where the irradiated point is to be projected, using the direction of the irradiated point and the distance thereto measured by the measuring unit 21 and calibration information stored in the storage unit 23 (step S103).

Subsequently, the determination unit 27 calculates the reliability of at least one of the measurement result of the measuring unit 21 and the image captured by the capturing unit 22, and determines whether a condition for performing a detection process for a calibration shift is satisfied by determining whether the calculated reliability satisfies a predetermined condition (step S105). In the case the reliability does not satisfy the predetermined condition, and the condition for performing a detection process for a calibration shift is not satisfied (No in step S105), the process is ended.

In the case the reliability satisfies the predetermined condition, and the condition for performing a detection process for a calibration shift is satisfied (Yes in step S105), the calculation unit 29 calculates, for each irradiated point, an amount of change in reflection intensity indicating an amount of change between the reflection intensity of the irradiated point and the reflection intensity of an irradiated point different from the aforementioned irradiated point, and obtains a reflection intensity change point which is an irradiated point for which the calculated amount of change in reflection intensity is equal to or greater than a first threshold value, and calculates, for each estimated projection position, an amount of change in brightness indicating an amount of change between the brightness at the estimated projection position and the brightness at an estimated projection position different from the aforementioned estimated projection position, and obtains a brightness change point which is an estimated projection position for which the calculated amount of change in brightness is equal to or greater than a second threshold value (step S107).

Then, the detection unit 31 compares the reflection intensity change point and the brightness change point obtained by the calculation unit 29, and if a change in the positional relationship between the measuring unit 21 and the capturing unit 22 equal to or greater than a threshold value is detected and a calibration shift is detected (Yes in step S109), the notification control unit 33 causes the notification unit 35 to issue a notification of the fact that the positional relationship between the measuring unit 21 and the capturing unit 22 has changed by a threshold value or more and a calibration shift has occurred (step S111).

If a calibration shift is not detected by the detection unit 31 (No in step S109), the process of step S111 is not performed.

As described above, according to the first embodiment, since a calibration shift is detected by comparing a reflection intensity change point and a brightness change point, the calibration shift may be detected by a simple configuration. Particularly, according to the first embodiment, a user may swiftly correct the calibration shift because occurrence of the calibration shift is notified to the user.

Second Embodiment

In a second embodiment, a case of automatically recalibrating a calibration shift is described. In the following, differences to the first embodiment are mainly described, and structural elements having the same functions as in the first embodiment will be denoted with the same names and reference numerals to thereby omit description thereof.

Figure 6:
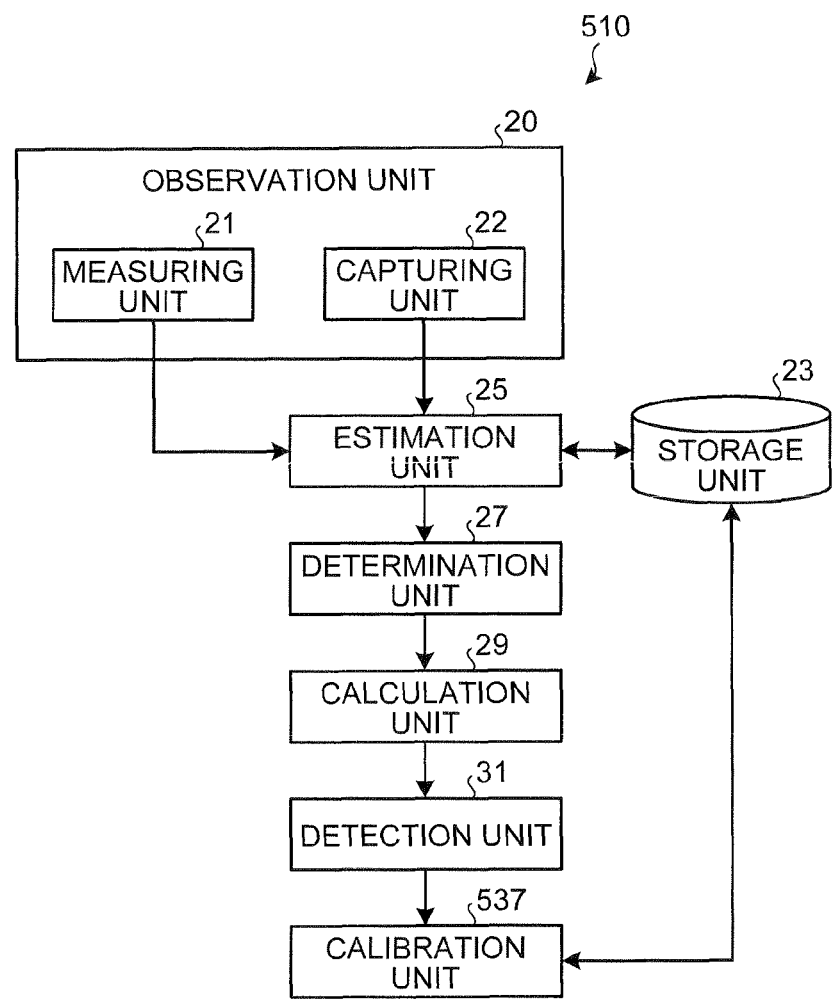
FIG. 6 is a configuration diagram showing an example of a measuring device of a second embodiment.

FIG. 6 is a configuration diagram showing an example of a measuring device 510 of the second embodiment. As shown in FIG. 6, the measuring device 510 is different from the first embodiment in that a calibration unit 537 is provided instead of the notification control unit 33 and the notification unit 35.

In the case a calibration shift is detected by the detection unit 31, the calibration unit 537 obtains rotation and translation parameters by which a first form of an object obtained by the measurement by the measuring unit 21 and a second form of the object obtained by the capturing by the capturing unit 22 are coincident. Then, the calibration unit 537 recalibrates the measuring unit 21 and the capturing unit 22 using the rotation and translation parameters, and updates the calibration information stored in the storage unit 23.

Figure 7:
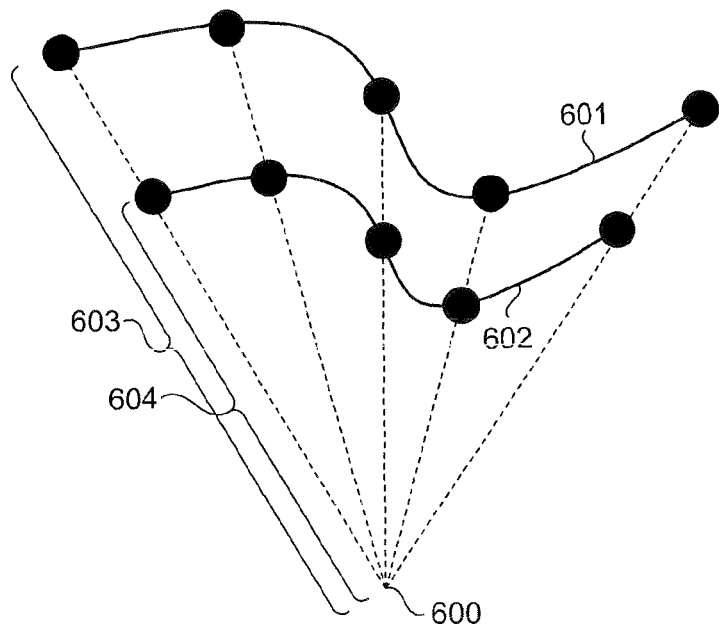
FIG. 7 is an explanatory diagram showing an example of a calibration method of the second embodiment.

FIG. 7 is an explanatory diagram showing an example of a calibration method of the second embodiment.

The capturing unit 22 captures an object a plurality of times to obtain a plurality of images, and calculates a first three-dimensional form 601 expressing the object by a group of points with three-dimensional positions by an SfM (Structure from Motion) method, for example. The calibration unit 537 may thereby calculate a first depth value 603 of each pixel of the image, that is, the distance from an optical center 600 of the capturing unit 22 to the object.

Also, the measuring unit 21 calculates a second three-dimensional form 602 for each image captured by the capturing unit 22, using the measured distance, direction and calibration information. The calibration unit 537 may thereby calculate, for each image captured by the capturing unit 22, a second depth value 604 of an irradiated point on the image.

Additionally, the scale of the first three-dimensional form 601 calculated by the SfM is generally different from the scale of the second three-dimensional form 602 measured by the measuring unit 21. However, when assuming that the calibration shift is small, the ratio between the first depth value 603 and the second depth value 604 is approximately constant for all pixels {p_i} of the image for which the second depth values 604 are stored.

Here, when the second depth value 604 and the first depth value 603 at a pixel p_i are given as d2_i and d1_i respectively, a scale S may be obtained by solving Formula (17).

$$\operatorname{argmin}_s \sum_{\{p\_i\}} \left(s - \frac{d2_i}{d1_i}\right)^2 \qquad (17)$$

Additionally, when referring to the $(s - d2_i/d1_i)$ as a difference, Formula (17) is an objective function that takes the square of the difference as a cost. Moreover, the cost is not limited to such, and a robust cost may be defined for a large difference, such as a sum of squares of the differences weighted according to the differences.

Then, the calibration unit 537 obtains the scale S, performs aligning with the current calibration information as an initial value, and corrects the calibration information. Here, an ICP (Iterative Closest Point) or Generalized ICP is preferably used for aligning, but this is not restrictive, and a three-dimensional point registration method may also be used. An initial value is important in such a non-linear optimization, and calibration information may be used as the initial value for the non-linear optimization.

FIG. 8 is a flow chart showing an example of flow of a process performed by the measuring device 510 of the second embodiment.

First, the process of steps S201 through S209 is the same as the process of steps S101 through S109 of the flow chart shown in FIG. 5.

Then, when a calibration shift is detected by the detection unit 31 (Yes in step S209), the calibration unit 537 obtains rotation and translation parameters by which a first form of an object obtained by the measurement by the measuring unit 21 and a second form of the object obtained by the capturing by the capturing unit 22 are coincident, recalibrates the measuring unit 21 and the capturing unit 22 using the rotation and translation parameters, and updates the calibration information stored in the storage unit 23 (step S211).

As described above, also according to the second embodiment, since a calibration shift is detected by comparing a reflection intensity change point and a brightness change point, the calibration shift may be detected by a simple configuration. Particularly, according to the second embodiment, the calibration shift may be swiftly corrected because recalibration is automatically performed with respect to the calibration shift.

Hardware Configuration

An example of the hardware configuration of the measuring device of each of the embodiments described above will be described. The measuring device of each of the embodiments described above includes a control device such as a CPU, a storage device such as a ROM or a RAM, an external storage device such as a HDD, a display device such as a display, an input device such as a keyboard or a mouse, and a communication device such as a communication interface, and has a hardware configuration that uses a general computer.

Programs to be executed by the measuring device of each of the embodiments described above are provided, being stored in a computer-readable storage medium, such as a CD-ROM, a CD-R, a memory card, a DVD (Digital Versatile Disk), or a flexible disk (FD), in the form of an installable or executable file.

Furthermore, the programs to be executed by the measuring device of each of the embodiments described above may be stored in a computer connected to a network such as the Internet, and may be provided by being downloaded via the network. Also, the programs to be executed by the measuring device of each of the embodiments described above may be provided or distributed via a network such as the Internet. Moreover, the programs to be executed by the measuring device of each of the embodiments described above may be provided, being embedded in a ROM or the like in advance.

The programs to be executed by the measuring device of each of the embodiments described above are configured as a module for realizing each unit described above on a computer. As the actual hardware, each unit described above is realized on the computer by the CPU reading the programs from the HDD onto the RAM and executing the same.

The execution order of the steps of the flow charts of the embodiments described above may be changed without departing from their nature, and a plurality of steps may be performed at the same time, or the order may be changed for each mode of performance.

As described above, according to each of the embodiments described above, a calibration shift may be detected by a simple structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A measuring device comprising:
a measuring unit configured to irradiate an object with a plurality of light beams, and measure, for each light beam, a direction of an irradiated point on the object, a distance to the irradiated point, and reflection intensity of the irradiated point;
a capturing unit configured to capture the object that has been irradiated with the light beams and obtain an image;
an estimation unit configured to estimate, for each irradiated point, an estimated projection position on the image where the irradiated point is to be projected, using the direction and the distance of the irradiated point and calibration information based on calibration of the measuring unit and the capturing unit performed in advance;
a calculator configured to
calculate, for each irradiated point, an amount of change in reflection intensity indicating an amount of change between the reflection intensity of the irradiated point and the reflection intensity of an irradiated point different from the irradiated point and obtain a reflection intensity change point which is an irradiated point for which the calculated amount of change in reflection intensity is equal to or greater than a first threshold value, and
calculate, for each estimated projection position, an amount of change in brightness indicating an amount of change between brightness at the estimated projection position and brightness at an estimated projection position different from the estimated projection position and obtain a brightness change point which is an estimated projection position for which the calculated amount of change in brightness is equal to or greater than a second threshold value; and
a detector configured to detect a calibration shift between the measuring unit and the capturing unit by comparing the reflection intensity change point and the brightness change point.

2. The device according to claim 1, wherein the calibration information indicates at least one of relative position and posture between the measuring unit and the capturing unit.

3. The device according to claim 1, wherein
the amount of change in reflection intensity indicates an amount of change in reflection intensity between adjacent irradiated points, and
the amount of change in brightness indicates an amount of change in brightness between adjacent estimated projection positions.

4. The device according to claim 1, wherein the detector detects the calibration shift based on a rate of coincidence between projection positions on the image of a plurality of reflection intensity change points obtained by the calculator and a plurality of brightness change points obtained by the calculation unit.

5. The device according to claim 1, further comprising
a notification unit configured to notify of detection of the calibration shift.

6. The device according to claim 1, further comprising
a calibrator configured to obtain, in a case where the calibration shift is detected, rotation and translation parameters by which a first form of the object obtained by measurement by the measuring unit and a second form of the object obtained by capturing by the capturing unit are coincident, calibrate the measuring unit and the capturing unit using the rotation and translation parameters, and update the calibration information.

7. The device according to claim 1, further comprising
a determination unit configured to calculate reliability of at least one of a measurement result of the measuring unit and the image, and determine whether the calculated reliability satisfies a predetermined condition, wherein
the detector stops detection of the calibration shift in a case where the reliability does not satisfy the predetermined condition.

8. A method comprising:
irradiating an object with a plurality of light beams and measuring, for each light beam, a direction of an irradiated point on the object, a distance to the irradiated point, and reflection intensity of the irradiated point, by a measuring unit;
capturing the object that has been irradiated with the light beams and obtaining an image, by a capturing unit;
estimating, for each irradiated point, an estimated projection position on the image where the irradiated point is to be projected, using the direction and the distance of the irradiated point and calibration information based on calibration of the measuring unit and the capturing unit performed in advance, by an estimation unit;
calculating, for each irradiated point, an amount of change in reflection intensity indicating an amount of change between the reflection intensity of the irradiated point and the reflection intensity of an irradiated point different from the irradiated point and obtaining a reflection intensity change point which is an irradiated point for which the calculated amount of change in reflection intensity is equal to or greater than a first threshold value, by a calculator;
calculating, for each estimated projection position, an amount of change in brightness indicating an amount of change between brightness at the estimated projection position and brightness at an estimated projection position different from the estimated projection position and obtaining a brightness change point which is an estimated projection position for which the calculated amount of change in brightness is equal to or greater than a second threshold value, by the calculator; and detecting a calibration shift between the measuring unit and the capturing unit by comparing the reflection intensity change point and the brightness change point, by a detector.

9. A computer program product comprising a non-transitory computer-readable medium containing a computer program that, when executed, causes a computer to perform at least:

causing a measuring unit to irradiate an object with a plurality of light beams and to measure, for each light beam, a direction of an irradiated point on the object, a distance to the irradiated point, and reflection intensity of the irradiated point;

causing a capturing unit to capture the object onto that has been irradiated with the light beams and to obtain an image;

estimating, for each irradiated point, an estimated projection position on the image where the irradiated point is to be projected, using the direction and the distance of the irradiated point and calibration information based on calibration of the measuring unit and the capturing unit performed in advance;

calculating, for each irradiated point, an amount of change in reflection intensity indicating an amount of change between the reflection intensity of the irradiated point and the reflection intensity of an irradiated point different from the irradiated point and obtaining a reflection intensity change point which is an irradiated point for which the calculated amount of change in reflection intensity is equal to or greater than a first threshold value;

calculating, for each estimated projection position, an amount of change in brightness indicating an amount of change between brightness at the estimated projection position and brightness at an estimated projection position different from the estimated projection position and obtaining a brightness change point which is an estimated projection position for which the calculated amount of change in brightness is equal to or greater than a second threshold value; and detecting a calibration shift between the measuring unit and the capturing unit by comparing the reflection intensity change point and the brightness change point.

* * * * *